May 2, 1933. W. V. EMERY 1,907,051

METALLIC WELDING ELECTRODE

Filed May 18, 1931

INVENTOR
Wallace V. Emery
BY
Charles & French
ATTORNEYS

Patented May 2, 1933

1,907,051

UNITED STATES PATENT OFFICE

WALLACE V. EMERY, OF WEST MILWAUKEE, WISCONSIN

METALLIC WELDING ELECTRODE

Application filed May 18, 1931. Serial No. 538,280.

The invention relates to metallic welding electrodes.

The usual metallic welding electrodes are straight rods round in cross section and the welding is accomplished by building up a series of deposits of this metal in the scarfe. Sometimes provision is made for oscillating the electrode to get a more extended distribution of the welding electrode and to do this the head carrying the electrode is moved. The object of the present invention is to provide a metallic welding electrode so shaped as to increase the area or cubic content of metal deposited by the electrode over that deposited by a straight electrode of a given size and more particularly to provide an electrode having what may be termed a corrugated formation so that the area of deposit is increased to the extent of the width of the corrugations.

A further object of the invention is to provide a metallic welding electrode of corrugated formation whose width or depositing area is in the proper relation to the width of the scarfe to be welded so that it is not necessary to oscillate the electrode and this has the advantages of accomplishing in one pass of the electrode what has formerly required two to four passes of the usual straight electrodes.

A further object of the invention is to provide an electrode of corrugated formation in which the flux or coating may be placed in the depressions between the corrugations and be heavier than that used on straight electrodes and yet provide for the proper contact of the welding equipment and the feed of the electrode.

A further object of the invention is to provide a metallic welding electrode which may be supplied as a coil and fed to the welding devices so that it is not necessary to use rods of predetermined length as is usually done in that type of equipment in which the electrode is oscillated.

The invention further consists in the several features hereinafter set forth and more particularly defined by claims at the conclusion hereof.

In the drawing, Fig. 1 is a detail side elevation of a piece of welding electrode embodying the invention;

Figure 1:
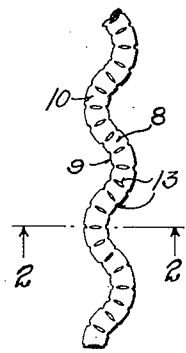

Referring to Figs. 1 to 4 of the drawing, the numeral 8 designates the improved metallic welding electrode which is preferably a round wire composed of any metal or composition of metals suitable for use in arc welding and formed so as to increase its depositing area in one dimension over that obtainable with a straight wire of the same given size, this increase in dimension being provided by forming the electrode into a series of corrugations 9 and thus forming a corrugated electrode, the particular shape of the corrugations to be determined by welding conditions though I have found that corrugations having rounded bends 10 appear to function better than corrugations with sharp angle bends.

Figure 2:
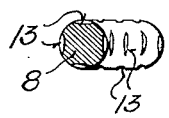
Fig. 2 is a detail sectional view taken on the line 2—2 of Fig. 1.
Figure 3:
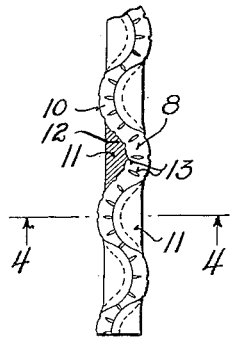
Fig. 3 is a detail side elevation view of a piece of the coated welding electrode embodying the invention.
Figure 4:
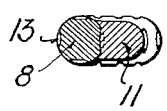
Fig. 4 is a detail sectional view taken on the line 4—4 of Fig. 3.

Depending upon the equipment used this electrode may or may not have the flux or coating applied thereto and the electrode shown in Figs. 1 and 2 is plain while that shown in Fig. 3 has the flux or coating 11 applied thereto. This flux or coating may be of any suitable kind known to the art and it will be noted that this coating is applied in the spaces 12 between the corrugations so that the proper functioning of the electrode with the contactors of the welding equipment such as automatic arc welding devices, is not interfered with and so that the electrode may be fed between the feed rolls of such equipment without disturbing the coating. The electrode itself may be knurled or provided with the usual roughened spots 13 to improve the adherence of the coating.

With the above construction it will be noted that as the electrode is deposited in the scarfe under the influence of the arc that it automatically acts to deposit itself over a larger area than could be covered by the deposit from a straight electrode of the same or substantially the same circular cross section and it also deposits a greater amount of metal in a given time as compared to the usual straight electrode. Thus a great saving of time is effected in making the weld.

Figure 5:
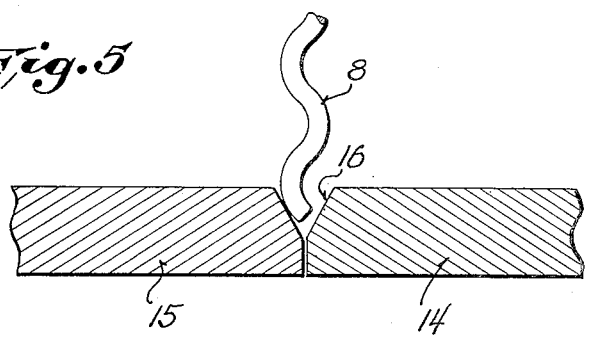
Fig. 5 is a detail sectional view through a joint to be welded showing the application of the electrode thereto.
Figure 6:
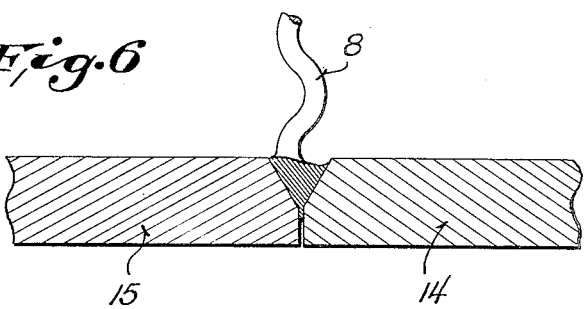
Fig. 6 is a view similar to Fig. 5 showing the weld farther advanced.

Furthermore, as shown in Figs. 5 and 6, the electrode embodying the invention may be made up so that the width of its corrugations, that is the distance through on a line normal to the bends is in proper relation to the width of the scarfe to be welded so that it is not necessary to oscillate the electrode. This width may not be equal to the width of the scarfe but is sufficient so that as the metal deposits it will fill up the width of the scarfe and that is what I mean by a width of electrode in proper relation to the width of the scarfe. As shown in Figs. 5 and 6, the two parts 14 and 15 to be welded together have the scarfe 16 formed therein and the electrode is shown at the start of the weld, while in Fig. 6 the electrode is shown as it is fed downwardly and deposits its metal across the scarfe without the necessity for oscillating it. With the above construction, a complete weld may be made in one pass with the welding apparatus where formerly from two to four passes have been required to do the same work and thus the time and labor connected with making the welded joint is greatly reduced. In some instances as where the welded joint is disposed adjacent wood or other inflammable material, a sealer bead is first made at the joint before starting the main weld and it will be understood that various modifications of use to suit the requirements of the different forms of joints may be practiced in the use of the electrode embodying the invention.

I therefore desire it to be understood that this invention is not to be limited to any specific details hereinbefore set forth except in so far as such limitations are included in the claims.

What I claim as my invention is:

1. As a new article of manufacture, a metallic welding electrode adapted for welding a linear scarfe, said electrode comprising a metal rod bearing lateral deformations of an amplitude slightly less than the width of said scarfe.

2. As a new article of manufacture, a metallic welding electrode adapted for welding a linear scarfe, said electrode comprising a metal rod bearing corrugations of an amplitude slightly less than the width of said scarfe.

3. As a new article of manufacture, a metallic welding electrode adapted for welding a linear scarfe, said electrode comprising a metal rod bearing rounded corrugations of an amplitude slightly less than the width of said scarfe.

4. As a new article of manufacture, a metallic welding electrode adapted for welding a linear scarfe, said electrode comprising a metal rod bearing corrugations of an amplitude slightly greater than the width of said scarfe less twice the depositing range of a metal depositing arc.

In testimony whereof, I affix my signature.

WALLACE V. EMERY.